J. TUNBRIDGE.
Separating Metals from Waste Solution.
No. 207,695. Patented Sept. 3, 1878.
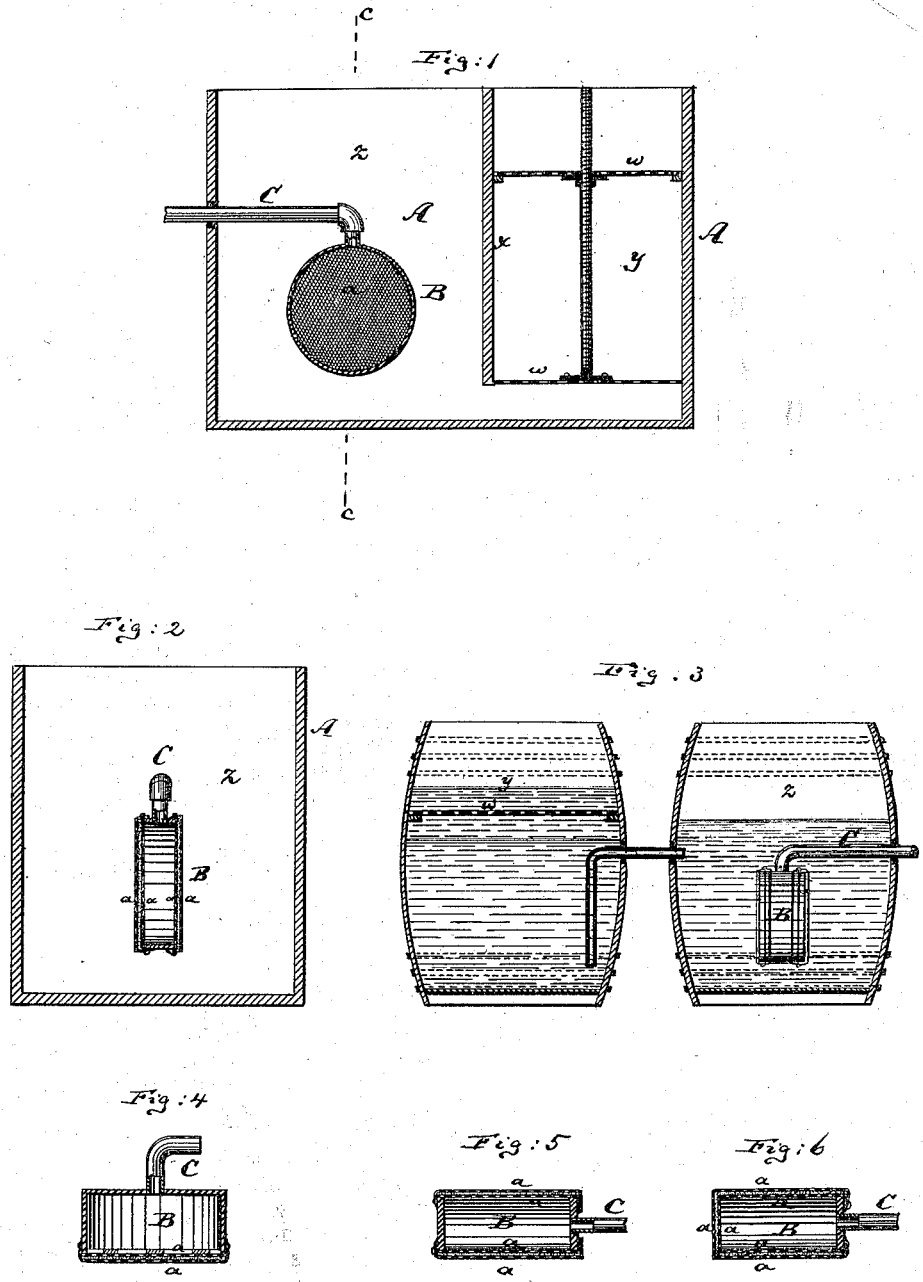

UNITED STATES PATENT OFFICE.

JOHN TUNBRIDGE, OF NEWARK, NEW JERSEY.

IMPROVEMENT IN SEPARATING METALS FROM WASTE SOLUTIONS.

Specification forming part of Letters Patent No. 207,695, dated September 3, 1878; application filed December 7, 1877.

*To all whom it may concern:*

Be it known that I, JOHN TUNBRIDGE, of Newark, Essex county, New Jersey, have invented an Improved Process of Separating Precious Metals from Watery Solutions, of which the following is a specification:

Figure 1 is a longitudinal section of the apparatus employed by me. Fig. 2 is a vertical transverse section of the same on the line $c\ c$, Fig. 1; Fig. 3, a vertical section of a modification of the same; and Figs. 4, 5, and 6 are detail vertical sections of further modifications.

Similar letters of reference indicate corresponding parts in all the figures.

This invention relates to a new process of separating from the water used by jewelers for washing, and from other water, the precious metals contained therein, and has for its object to collect gold or other precious substances which may and frequently do enter into the waste-water so used and into other water, and which are lost if not specially reclaimed from the water. Complicated devices of various kinds have heretofore been used for the same purpose; but they were costly and not always efficient.

My invention consists, first, in subjecting the waste-water to a bath of oil or hydrocarbon liquid, so as to separate the soapy matter contained in the water and collect the particles of metal contained in the water The invention also consists in passing the water, treated as already stated, through a combustible filter, and thence off through a discharge-pipe.

The letter A in the drawing represents the receiving-vessel, being a simple tank, cask, or other suitable vessel, destined to receive the waste-water used by jewelers, or other water containing precious metals in reduced state. There may in some cases be a series of such vessels, placed side by side, as indicated in Fig. 3, so that the matter partly filtered or cleaned in one vessel may be refiltered in the next, and so on; thereby insuring greater certainty in operation. The vessel A, as shown in Fig. 1, is provided with a partition, $x$, which divides it into two compartments, $y$ and $z$, that communicate with each other at the bottom. The compartment $y$ is or may be provided with a sieve or sieves, $w$, placed transversely therein;
but these sieves are not absolutely necessary, although they are desirable for the purpose of subdividing the soapy matter which may pass down with the water. Within the other compartment, $z$, is held suspended the filtering-box B, which communicates with a discharge-pipe, C. In fact, there may be within the same vessel two or more filtering-boxes, B B, joined to the same pipe C. The filtering-box is suspended at such a height within the compartment $z$ of the vessel A that it will be at a considerable distance below the top of said vessel and sufficiently far above the bottom thereof to allow the collection of solid matter on the bottom without interference with the operation of the filter. The filter itself, on the filter-box B, is made of two sheets of asbestus or other netting or perforated fabric, $a\ a$, between which two sheets a layer of vegetable fiber or other combustible substance is clamped. This constitutes a combustible filtering substance, which is burned when the valuable matter collected on it is to be regained.

In operation, clean water is first filled into the vessel A, and thereupon oil or hydrocarbon liquid is poured on top of the water in the compartment $y$. The waste-water to be filtered is next poured into the compartment $y$, so that it will have to pass through the layer of oil or hydrocarbon liquid before it can reach the filter-box in the compartment $z$. The oil takes up and combines with the soapy matter in the waste-water, and retains, also, the fine particles of gold suspended therein, and prevents such matter from reaching the filter and from clogging it, while the disks $w$ subdivide such portions of the soapy matter as are not suspended by the oil or hydrocarbon. After the oil has in course of time thus combined with a sufficient quantity of the suds and precious metals, the resulting composition can be taken out and burned to cause it to yield whatever particles of gold or other precious substance may have adhered to it. The waste-water, after it has passed through the oil in the compartment $y$, enters the compartment $z$, and flows off through the filter-box B and pipe C. Whatever solid matter there may be in the water will, by the filter, be prevented from entering the box B, and will from time to time drop off the filter and settle on the bottom of the tank A. In this manner the substances which may be expected to contain the gold or precious matter will necessarily be found at the bottom of the tank A in form of a sediment. Some may also collect on the filter and can be scraped off, and some may even enter and settle in the fibrous combustible filter. To reach this last portion of the sediment the filter is from time to time taken apart, and the old wadding taken out and burned. The asbestus or other netting may be exposed to strong heat for the like purpose. In like manner are treated the precipitates in the tank A and the matter scraped from the filter—that is to say, they are either burned or treated chemically or otherwise, so that the metallic portions contained in them may be readily collected for further use.

I prefer to have the filter-box placed as in Figs. 1 and 2, with the filter proper forming two upright sides thereof, as by this means the adhesion of slimy and semi-fluid matter to the filter is to a great extent avoided, and the operation of the filter maintained for a longer period without obstruction; but instead of this, filters such as shown in Figs. 4, 5, and 6 may be used—that is to say, filter-boxes having filters either at the bottom or circumferentially, or both circumferentially and vertically, as may be desired. In each of these cases, however, the filter proper is constructed, as already stated, of two sheets, $a$ $a$, of asbestus netting or perforated fabric, containing between them the combustible vegetable fiber which constitutes the absorbent.

I claim as my invention—

1. The process herein described of separating precious metals from watery solutions, in which said metals are suspended by passing the watery solutions or suds through a bath of oil or hydrocarbon liquid, substantially as specified.

2. The process herein described of separating precious metals from watery solutions, in which said metals are suspended by passing said solutions through fat or hydrocarbon liquid and through a filter, substantially as specified.

JOHN TUNBRIDGE.

Witnesses:
F. V. BRIESEN,
T. B. MOSHER.